United States Patent [19]

Palazzetti

[11] 4,159,709
[45] Jul. 3, 1979

[54] LOW COST SOLAR PANEL

[75] Inventor: Mario Palazzetti, Avigliana, Italy

[73] Assignee: Fiat Societa per Azioni, Turin, Italy

[21] Appl. No.: 816,991

[22] Filed: Jul. 19, 1977

[30] Foreign Application Priority Data

Jul. 20, 1976 [IT] Italy ............................. 68809 A/73

[51] Int. Cl.² ............................ F24J 3/02; F24F 3/14
[52] U.S. Cl. ................................ 126/271; 165/170
[58] Field of Search ............... 126/270, 271; 165/170

[56] References Cited

U.S. PATENT DOCUMENTS

| 3,076,450 | 2/1963 | Gough et al. | 126/271 |
| 4,008,708 | 2/1977 | Hagarty | 126/271 |
| 4,026,268 | 5/1977 | Bartos et al. | 126/271 |
| 4,046,133 | 9/1977 | Cook | 126/271 |
| 4,058,111 | 11/1977 | Wendel | 126/271 |

*Primary Examiner*—John J. Vrablik
*Attorney, Agent, or Firm*—Sughrue, Rothwell, Mion, Zinn and Macpeak

[57] ABSTRACT

A low-cost solar panel is fabricated from three laminated plastics layers, the upper two layers being transparent to luminous and infra-red solar radiation and the bottom layer being opaque; in one version water to be heated flows first between the upper two layers and then between the lower two layers to be further heated in flowing over the bottom layer.

3 Claims, 5 Drawing Figures

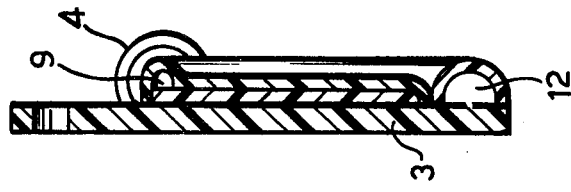
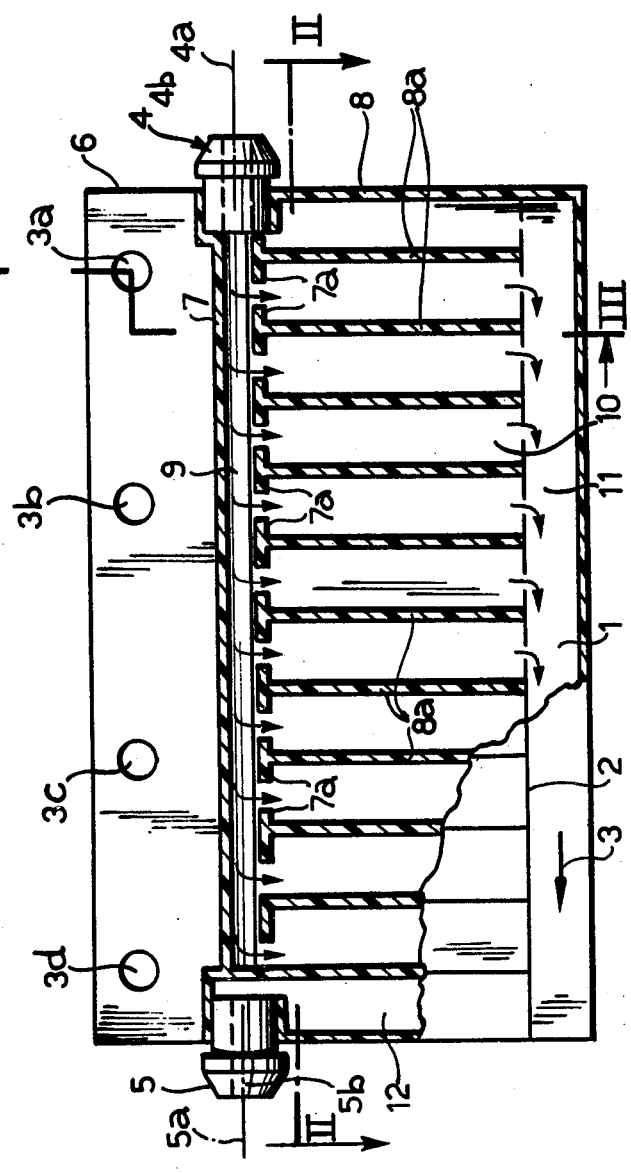
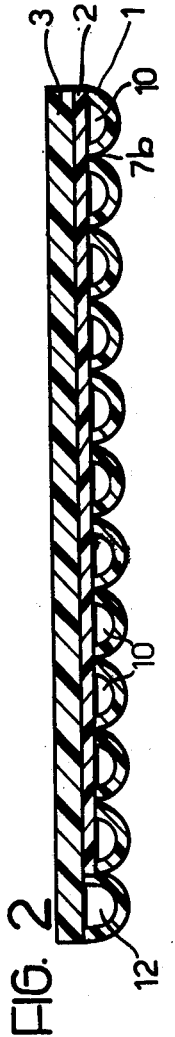

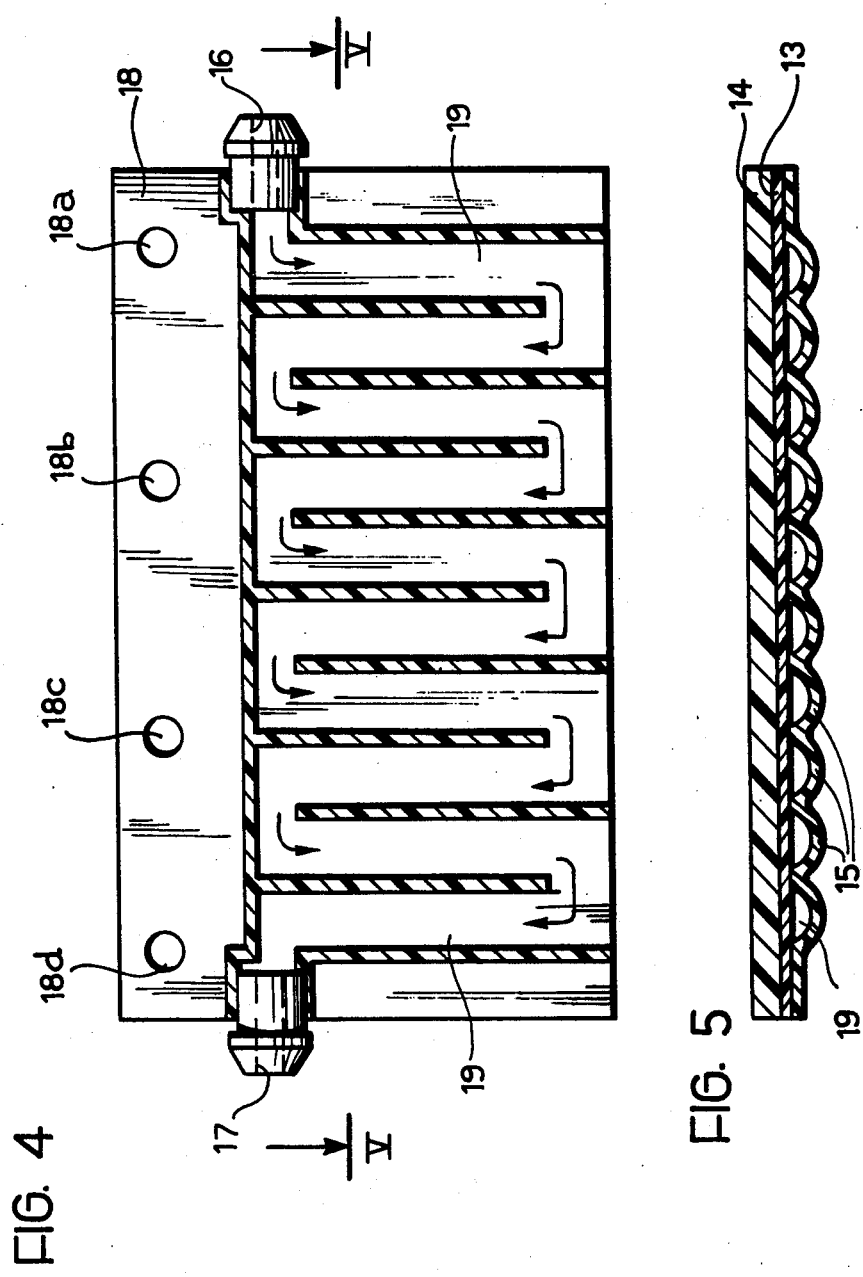

LOW COST SOLAR PANEL

The present invention relates to solar panels, in particular panels designed to absorb solar energy, whether in the form of luminous or infra-red radiation, in order to use it for the heating of water. Such solar heat collecting panels have application to the heating of water in, for example, one-family homes, condominiums, camps, hotels, sport installations and agricultural premises, where the use of the panel supplements traditional heating installations and hot water systems such as, for example, electrical water heaters and hot water storage tanks.

A fundamental problem of the prior art consists in realizing an economically convenient solar panel, which permits a completely passive working cycle, or which entails the minimum waste of "primary power" by providing for the recycling of water to be heated with a minimum of auxiliary components.

The state of the prior art for the manufacture of solar panels has disadvantages because the ratio of the panel weight to the quantity of stored heat is quite high compared with the panel of the present invention, given the same amount of kilocalories yielded to the circulating water.

Furthermore prior art panels, although allowing almost full exploitation of the incident luminous energy, are inferior as regards the thermal insulation.

The present invention enables a solar panel to be manufactured at low cost and in a way lending itself to automatic production, the panel being, in operation, energetically passive and self-regulating.

It has been established that in order to improve the ratio of the weight to the quantity of heat captured and obtained, while decreasing the radiant energy dispersed to the outside of the panel, it is necessary first to pre-heat the water followed by a further heating of the pre-heated water. By keeping the water in a laminar flow regime an effect of thermal insulation is obtained, which also utilizes the optical qualities of the water to allow the realization of an efficient and economical panel transparent to visible radiation.

According to the present invention there is provided a solar panel for absorbing luminous and infra-red radiation for the heating of water, characterised in that it comprises a first plastics layer or wall transparent to said radiations, a second plastics layer or wall also transparent, and a third plastics layer or wall, opaque to said infra-red and luminous radiation.

The present invention will be further described, by way of example, with reference to the accompanying drawings, given by way of example, in which:

FIG. 1 represents an outside view, partially cut-away in the lower left-hand corner, of a preferred embodiment of this invention, for the two-stage heating of water from an outside source;

FIG. 2 is a cross-section taken on the line II—II of FIG. 1;

FIG. 3 is a cross-section taken on the line III—III of FIG. 1;

FIG. 4 represents an external plan view of a further embodiment of this invention in which water from an outside source is directly heated; and FIG. 5 is a cross-section taken on line V—V of FIG. 4.

The solar panel illustrated in FIGS. 1, 2 and 3 comprises a transparent first layer or wall 1, for example of clear plastics sheet, a light-transmitting second plastics layer or wall 2 and an opaque third layer or wall 3 of black plastics forming the bottom surface of the solar panel.

An inlet connection 4 for admitting water is located in the right upper corner of the panel, as shown in FIG. 1, and is inserted between the transparent first layer or wall 1 and said second layer or wall 2. An outlet connection 5 for the outflow of water is located in the left upper corner of the panel, and is inserted between the first layer or wall 1 and the third layer or wall 3, the axis 5a of the flow duct 5b of the outlet connection 5 being coaxial with the axis 4a of the flow duct 4b of the inlet connection 4.

A flat tongue 6 formed by an integral appendix of the black plastics third layer or wall 3 extends along one longitudinal edge of the panel, adjacent the connections 4 and 5, and has a series of holes 3a, 3b, 3c, 3d, of a diameter suitable to provide for the fixing of the panel to the roof of a building or other support structure.

A series of welds, only partially indicated in FIGS. 1 and 2 for reasons of clarity by reference numerals 7, 7a, 7b, 8, 8a, serve to subdivide the three plastics layers into a number of intercommunicating ducts of which those indicated by reference numerals 9 and 10 are obtained by the welding together of the first and the second layers or walls 1 and 2 and those indicated by reference numerals 11 and 12 are obtained by the welding together of the first and the third layers or walls 1 and 3, the welds, being indicated by shaded areas in FIG. 1.

In the installed position of the panel the ducts 9 and 11 are horizontal and the ducts 10 and 12 are vertical or inclined to the vertical.

Still referring to FIGS. 1, 2, 3, the operation of the illustrated panel according to this invention will now be described. During the water pre-heating phase water flows, through the inlet connection 4, under slight pressure and with laminar flow into the horizontal duct 9 formed, as previously stated, by the joining of the first and second layers or walls 1 and 2. From the duct 9, which acts as a manifold, the water passes, still with laminar flow, along the vertical ducts 10, absorbing part of the solar energy and recovering heat absorbed by the underlying layer 2, the water being pre-heated in the process.

The flow of pre-heated water collects in the duct 11 formed, as previously stated, by the joining together of the first and the third layers or walls 1 and 3. In this way only the pre-heated water circulates in the duct 11 formed between the first and third layers 1 and 3, in which the water comes into direct contact with the black surface of said third layer or wall 3. A suitable corrugation of the surface of the layer or wall 3, favouring multiple reflections, improves the co-efficient of absorption of the layer or wall 3. The mass of pre-heated water flowing over the surface of the third layer or wall 3 absorbs almost all the remaining solar energy collected by the panel. The heated water flows through the vertical duct 12 and the outlet connection 5 to a utilization or storage device (not shown).

In the arrangement of FIGS. 1 to 3 the total quantity of wasted heat is much lower than that of the prior art for the reasons previously explained because part of the collected solar energy is retained by the panel and subsequently given up to the pre-heated mass of water by the third layer or wall 3, the jump in temperature between the pre-heated water and the ambient temperature being less than that between the final water temperature and the ambient temperature.

A further embodiment of a solar panel according to the invention is shown in FIGS. 4 and 5. Reference numeral 13 indicates a first layer of plastics with blackened bottom surface; reference numeral 14 indicates a thermally insulating layer acting as a base for supporting the solar panel on the roof of a building and reference numeral 15 indicates a second layer of transparent plastics adapted to filter the solar radiation.

An inlet connection 16 and an outlet connection 17 for water are located in the upper part of the panel at opposite ends thereof.

A flat tongue 18 along the upper longitudinal edge of the panel is provided with a series of holes 18a, 18b, 18c, 18d for the fixing of the panel as previously described with reference to FIG. 1.

A series of welds are effected between the plastics layers of the panel, as illustrated in FIG. 4, to subdivide the two plastics layers into a series of ducts 19 interconnected in series to form a flow labyrinth for the through flow of water to be heated, interconnecting the inlet and outlet connections 16 and 17.

In order to ensure an even concentration of solar radiation on the mass of water to be heated a third layer of clear plastics (not shown) may be superimposed on the second layer, 15 of transparent plastics so as to take advantage of the so called "greenhouse effect."

Naturally while keeping to the principle of this invention and to the embodiments described, it is possible to vary details of construction widely relative to what has been described and illustrated without departing from the scope of the present invention.

I claim:

1. A solar panel for absorbing luminous and infra-red radiation for the heating of water, comprising a first plastics layer transparent to said radiation, a second plastics layer also transparent to said radiation and a third plastics layer opaque to said radiation, said second layer being secured to said third layer, a portion of said first layer being coextensive with said second layer, said first and second layers being secured together at spaced apart locations to define therebetween a plurality of interconnected preheating flow ducts, inlet means disposed between said first and second layers to provide for the supply of fluid to said preheating flow ducts, a second portion of said first layer extending beyond said second layer in spaced relation to said third layer, said second portion of said first layer being connected about the periphery thereof to said third layer to define additional flow ducts between said first and third layers in fluid communication with said preheating flow ducts and outlet means for the fluid disposed between said first and third layers.

2. A solar panel as set forth in claim 1, wherein a portion of said third layer extends beyond said first and second layers and is provided with means for securing said panel to a supporting structure.

3. A solar panel as set forth in claim 1, wherein said panel is flexible and adaptable to any supporting structure.